UNITED STATES PATENT OFFICE.

FRITZ SINGER, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

VAT DYES AND PROCESS OF MAKING SAME.

1,070,196. Specification of Letters Patent. Patented Aug. 12, 1913.

No Drawing. Application filed March 30, 1912. Serial No. 687,461.

*To all whom it may concern:*

Be it known that I, FRITZ SINGER, doctor of philosophy, chemist, a subject of the German Emperor, and resident of Offenbach-on-the-Main, in the Grand Duchy of Hesse, Germany, with post-office address Mainstrasse, No. 179, have invented new and useful Improvements in Vat Dyes and Processes of Making Same, of which the following is a specification.

My invention relates to the manufacture and production of new vat dyestuffs of the anthraquinone series which can be obtained by acting of diazo compounds of the aromatic series upon such aromatic amins as contain in the aromatic residue, in which is present the amino group, such substituents, as prevent the entrance of the diazo group in the para- and ortho position to the amino group, wherein at least one of these bodies belongs to the anthraquinone series.

The new compounds have probably the following general formula:

wherein $R_1$ and $R_2$ means aromatic radicals, of which one at least belongs to the anthraquinone series. $R_3$ may be H, $CH_3$, $C_6H_5.CO$.

The reaction is carried out by combining the diazo compounds of the anthraquinone series with amins of the benzene-, naphthalene-, anthracene series and other bodies, as contain in the aromatic residue, in which is present the amino group, such substituents, as prevent the entrance of the diazo group in the para- and ortho position to the amino group, or by acting with diazo compounds of the benzene-, naphthalene- or anthracene series upon amino-anthraquinone.

As substitutes, which prevent the entrance of the diazo group in the para-position to the amino group, any substitute may be taken, which has its place already in the para-position to the amino group, or negative substitutes, for example halogen or nitro groups, which are in the ortho- or meta-position to the amino group. The such obtained bodies are in the cold of very good fastness against alkaline means of reduction and the leuco compounds thereof can be fixed on the unmordanted fiber and give yellow to red shades by the subsequent oxidation.

In carrying out the new process practically I can proceed as follows, parts being by weight:

Example I: 23 parts of 1-aminoanthraquinone are dissolved in 120 parts of sulfuric acid of 66° Bé. To this solution of 1-aminoanthraquinone sulfate, cooled with 100 parts of ice at 10° C., is added a concentrated solution of 8 parts of sodium nitrite while stirring until the diazotation is completed. Then water is added until no more diazoniumsulfate is precipitated, filtered off and the residue dissolved in 2.5 liters of water. Into this solution are poured 10 parts of paratoluidin, dissolved in 10 parts of hydrochloric acid of 20° Bé. and 500 parts of water. The formation of dyestuff is completed by addition of sodium acetate. The precipitated red flakes are filtered, washed and ground with water to a paste. In dry shape the dyestuff forms a red powder soluble in nitrobenzene with brown orange color, in concentrated sulfuric acid with red orange color. From brown-violet vat cotton is dyed orange red shades which on subsequent treatment with a hot soap solution are turned into yellowish-red of very good fastness against washing and chlorin.

The product obtained by Example I, is represented by the following structural formula:

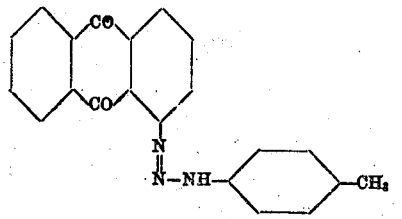

Example II: 25 parts of 2-diazo-anthraquinone-sulfate dried at low temperature are suspended into 300 parts of concentrated acetic acid. Then 10 parts of 1.5-diamino-anthraquinone and 20 parts of sodium acetate are added and the suspension is stirred at 30–40° C. until no more diazoniumsulfate is present. The dyestuff is filtered off, washed with water and ground to a paste.

In dry state it forms a brown powder soluble in nitrobenzene with deep orange color, in concentrated sulfuric acid with red orange color. From black-brown vat cotton is dyed orange-brown shades.

The product obtained by Example II is represented by the following structural formula:

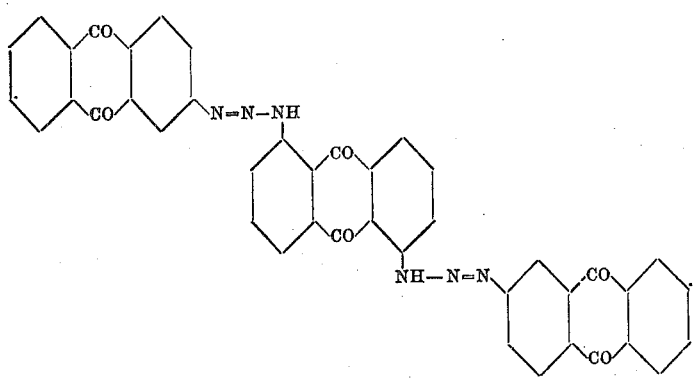

Example III: 32 parts of 2.5-dichloranilin are dissolved in 750 parts of concentrated acetic acid and 40 parts of hydrochloric acid of 20° Bé. and are diazotized with 12 parts of sodium-nitrite. Then 45 parts of finely divided 2-aminoanthraquinone and 50 parts of sodium acetate are added while stirring well at 30–40° C., until the formation of the dyestuff is completed. Then the dyestuff is filtered, washed with concentrated acetic acid and water and the residue is ground with water to a paste. The dyestuff forms in dry shape a yellow powder soluble in nitro-benzene with yellow-orange color, in concentrated sulfuric acid with orange red color. From red brown vat cotton is dyed golden yellow shades.

The product obtained by Example III is represented by the following structural formula:

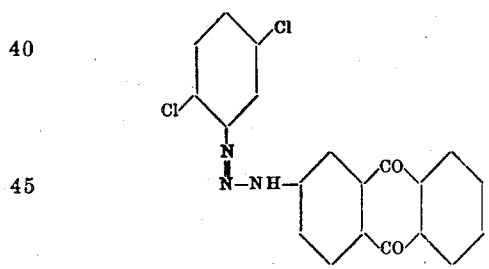

Some of the dyestuffs obtainable according to the present process are described in the following table:

| Dyestuff obtained from— | And— | Color of the vat. | Dyes cotton. |
|---|---|---|---|
| 2-Diazoanthraquinone. | p-Toluidin | Brown violet. | Golden yellow. |
| Do | 3.4-Dichloroanilin | ....do..... | Yellow. |
| Do | m-Chloroanilin | Corinth... | Yellow red. |
| Do | Dehydrothiotoluidin. | Black brown. | Orange. |
| Do | 2.5-Dichloroanilin | Corinth... | Yellow red. |
| Do | p-Chloroanilin | Bordeaux | Orange red. |
| 2-molecules of 2-diazoanthraquinone. | 1.5-Diaminoanthraquinone. | Black brown. | Orange brown. |
| Do | 1.4-Diaminoanthraquinone. | Reddish deep brown. | Gray. |
| 2-Diazoanthraquinone. | p-Aminoacetanilid. | Brown blue. | Orange red. |
| 1-Diazoanthraquinone. | p-Toluidin | Brown violet. | Red. |
| Do | p-Chloroanilin | Yellowish-brown blue. | Yellow orange. |
| Do | 2.5-Dichloroanilin | Brown blue. | Yellow red. |
| 2.5-Dichlorodiazobenzene. | 2-Aminoanthraquinone. | Red brown | Golden yellow. |

Now what I claim and desire to secure by Letters Patent is the following:

1. The process for the production of vat dyes of the anthraquinone series consisting in combining diazo compounds of the aromatic series with such aromatic amins as contain in the aromatic residue, in which is present the amino group, such substituents, as prevent the entrance of the diazo group in the para and ortho position to the amino group, wherein at least one of these bodies belongs to the anthraquinone series.

2. As new articles, the vat dyes of the anthraquinone series which can be obtained by combining aromatic diazo compounds with such aromatic amins as contain in the aromatic residue, in which is present the amino group, such substituents, as prevent the entrance of the diazo group in the para- and ortho-position to the amino group, wherein at least one of these bodies belongs to the anthraquinone series, which dyestuffs form brown to yellowish red powders insoluble in water, soluble in nitrobenzene with orange brown to deep orange color, in concentrated sulfuric acid with brown to orange red color and yield with alkaline hydrosulfite a brown violet to red brown vat, from which cotton is dyed very fast yellow to red shades.

In testimony, that I claim the foregoing as my invention, I have signed my name in presence of two witnesses, this sixteenth day of March 1912.

FRITZ SINGER.

Witnesses:
PETER LAUTENSCHLAGER,
FRITZ DÉSOR.